US012264805B1

(12) United States Patent
Xu et al.

(10) Patent No.: US 12,264,805 B1
(45) Date of Patent: Apr. 1, 2025

(54) LED LAMP WITH QUICK DISASSEMBLING STRUCTURE

(71) Applicant: SHENZHEN SNC OPTO ELECTRONIC CO., LTD., Guangdong (CN)

(72) Inventors: Jianyong Xu, Guangdong (CN); Anle Zhao, Guangdong (CN); Shengkang Chen, Guangdong (CN)

(73) Assignee: SHENZHEN SNC OPTO ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 18/672,071

(22) Filed: May 23, 2024

(30) Foreign Application Priority Data

Jan. 12, 2024 (CN) ......................... 202420080948.1

(51) Int. Cl.

| | |
|---|---|
| ***F21V 17/06*** | (2006.01) |
| ***F21V 17/16*** | (2006.01) |
| ***F21V 21/008*** | (2006.01) |
| ***F21V 21/30*** | (2006.01) |
| ***F21V 23/00*** | (2015.01) |
| ***F21V 31/00*** | (2006.01) |
| *F21Y 105/14* | (2016.01) |
| *F21Y 115/10* | (2016.01) |

(52) U.S. Cl.
CPC .............. *F21V 17/06* (2013.01); *F21V 17/16* (2013.01); *F21V 21/008* (2013.01); *F21V 21/30* (2013.01); *F21V 23/008* (2013.01); *F21V 31/005* (2013.01); *F21Y 2105/14* (2016.08); *F21Y 2115/10* (2016.08)

(58) Field of Classification Search
CPC ......... F21V 17/06; F21V 17/16; F21V 21/008
See application file for complete search history.

(56) References Cited

U.S. PATENT DOCUMENTS

2024/0165285 A1* 5/2024 Chen ......................... F21K 9/23

FOREIGN PATENT DOCUMENTS

CN 215230532 U * 12/2021 ............... A61L 2/10
CN 215411774 U * 1/2022 ............ F21V 21/002

* cited by examiner

*Primary Examiner* — Karabi Guharay

(57) ABSTRACT

An LED lamp includes a lamp body provided with a mounting space on a front side thereof; an LED lamp panel mounted in the mounting space; a lens panel covering the LED lamp panel; a power supply assembly mounted on a rear side of the lamp body, the power supply assembly including a power supply box and a driving power supply mounted in the power supply box, and the driving power supply being electrically connected to the LED lamp panel; and a quick disassembling structure through which the power supply box being detachably connected to the lamp body.

7 Claims, 6 Drawing Sheets

LED LAMP WITH QUICK DISASSEMBLING STRUCTURE

CROSS-REFERENCE TO RELATED APPLICATIONS

This application claims priority of Chinese Patent Application No. 202420080948.1, filed on Jan. 12, 2024, entitled "LED LAMP", the entire content of which is incorporated herein in its entirety.

TECHNICAL FIELD

The present disclosure relates to lighting devices, and in particular to an LED lamp.

BACKGROUND

LED lamps have many advantages such as energy saving, environmental protection, long life, and have been widely used in various lighting places. However, when replacing a driving power supply, multi-step disassembly is required, and parts fixed by screws shall be disassembled and assembled with tools, which is inconvenient and time-consuming, and it is difficult to replace the driving power supply of the LED lamp quickly and conveniently. Therefore, it is necessary to improve a structure of the LED lamp.

SUMMARY

Accordingly, the present disclosure provides an LED lamp, a driving power supply of which can be replaced without an additional tool.

An LED lamp includes a lamp body provided with a mounting space on a front side thereof; an LED lamp panel mounted in the mounting space; a lens panel covering the LED lamp panel; a power supply assembly mounted on a rear side of the lamp body, the power supply assembly including a power supply box and a driving power supply mounted in the power supply box, and the driving power supply being electrically connected to the LED lamp panel; and a quick disassembling structure through which the power supply box being detachably connected to the lamp body.

In one of the embodiments, the quick disassembling structure is a snap-fit assembly.

In one of the embodiments, the LED lamp further includes a connecting member, the snap-fit assembly includes a locking handle and a locking base, the locking base extends outwardly from an edge of the power supply box and is provided with a groove, the locking handle is rotatably connected to the lamp body through the connecting member, and an end of the locking handle is provided with a cam configured to be engaged in the groove.

In one of the embodiments, an end of the connecting member is fixed to the lamp body, and the locking handle is rotatably connected to another end of the connecting member.

In one of the embodiments, the locking handle includes a straight plate on a middle portion thereof extending downwardly and a first hook provided on the straight plate, the lamp body includes a reinforcing plate corresponding to the straight plate, the reinforcing plate is provided with a second hook, when the cam is engaged in the groove, the first hook is engaged with the second hook.

In one of the embodiments, at least two quick disassembling structures are provided.

In one of the embodiments, the LED lamp further includes a mounting bracket connected to the lamp body.

In one of the embodiments, the LED lamp further includes a hanging ring connected to the power supply box.

In one of the embodiments, the LED lamp further includes a sealing ring provided between the power supply box and the lamp body.

These and other objects, advantages, purposes and features will become apparent upon review of the following specification in conjunction with the drawings.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

REFERENCE SIGNS

Figure 1:
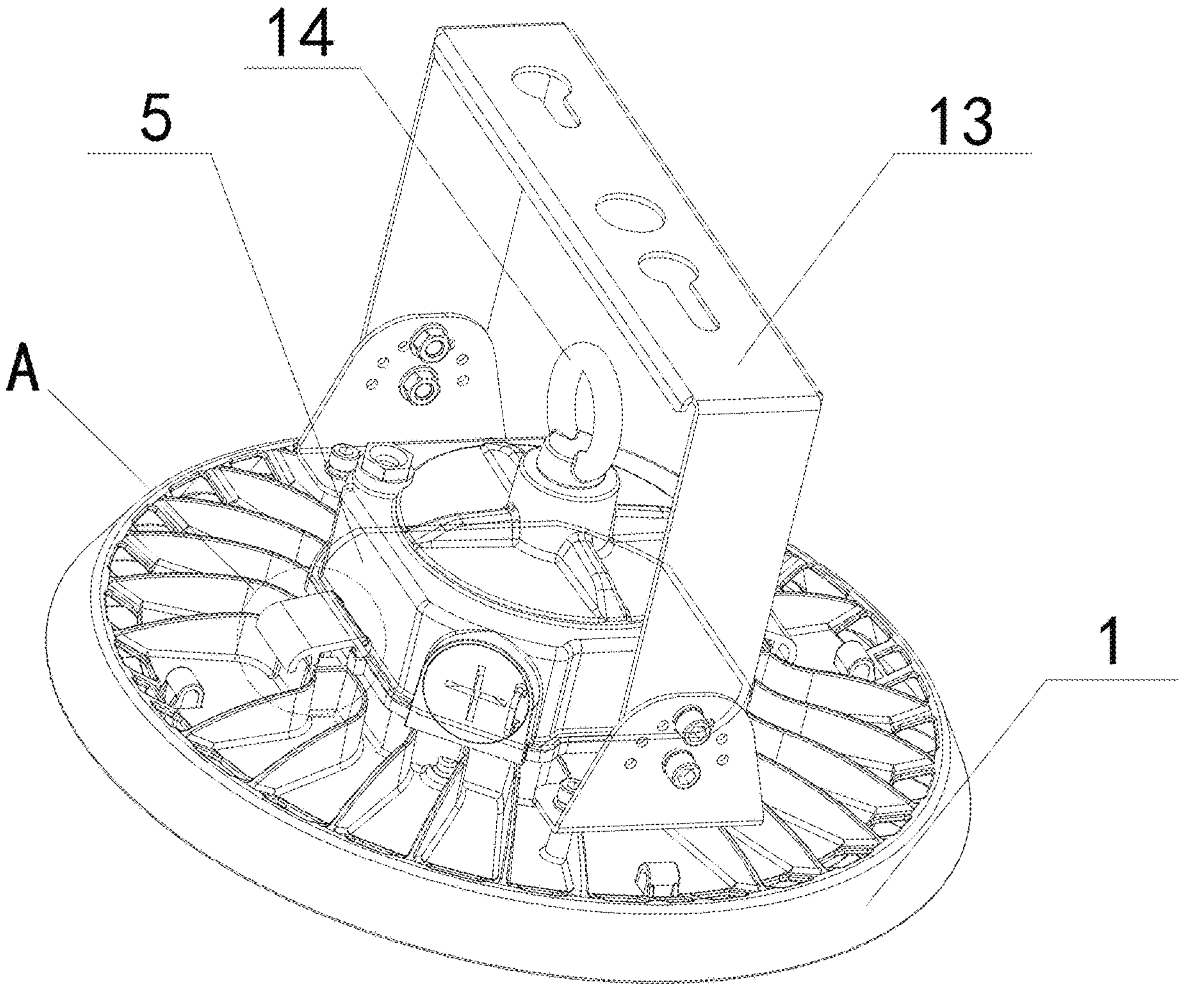
FIG. 1 is a perspective view of an LED lamp according to an embodiment of the present disclosure.
Figure 2:
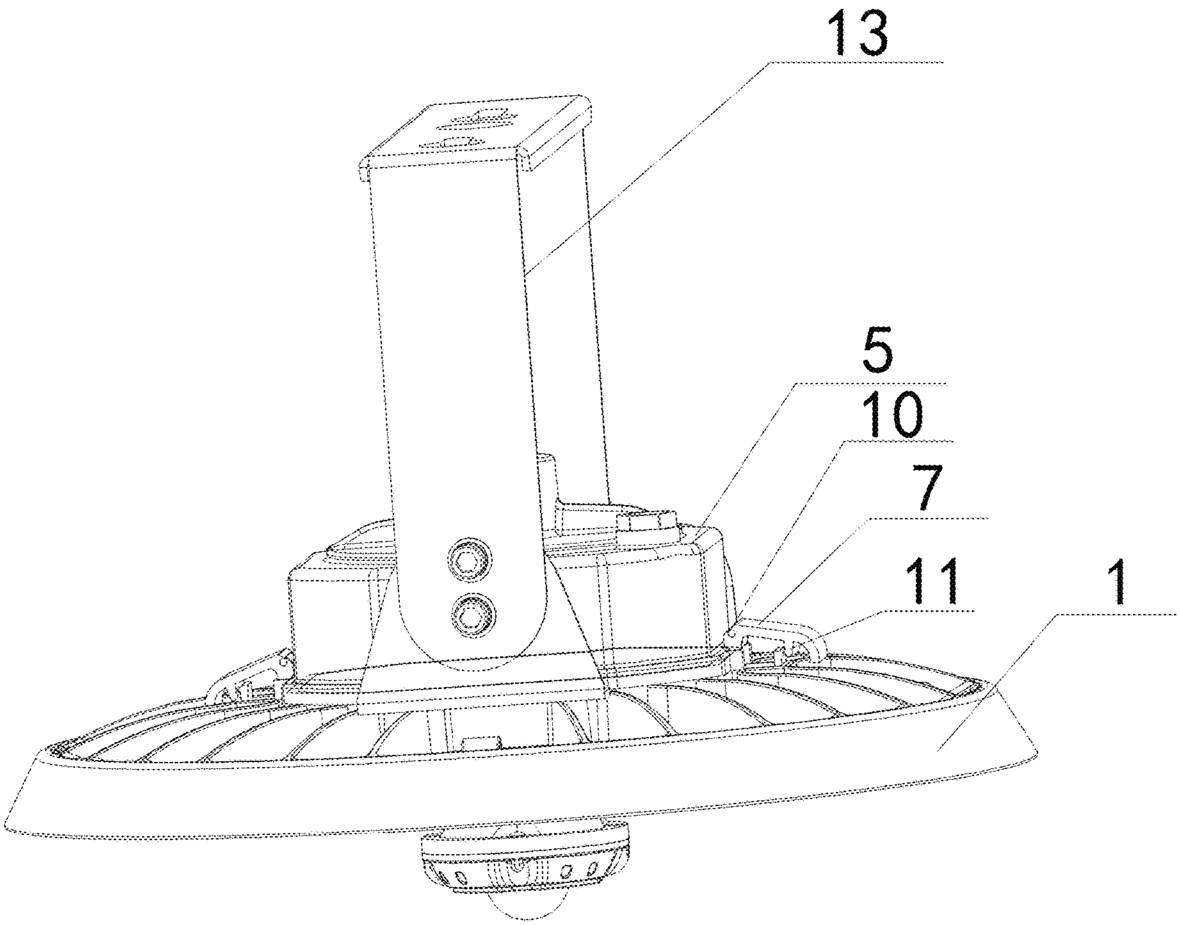
FIG. 2 is similar to FIG. 1, but viewed from another aspect.
Figure 3:
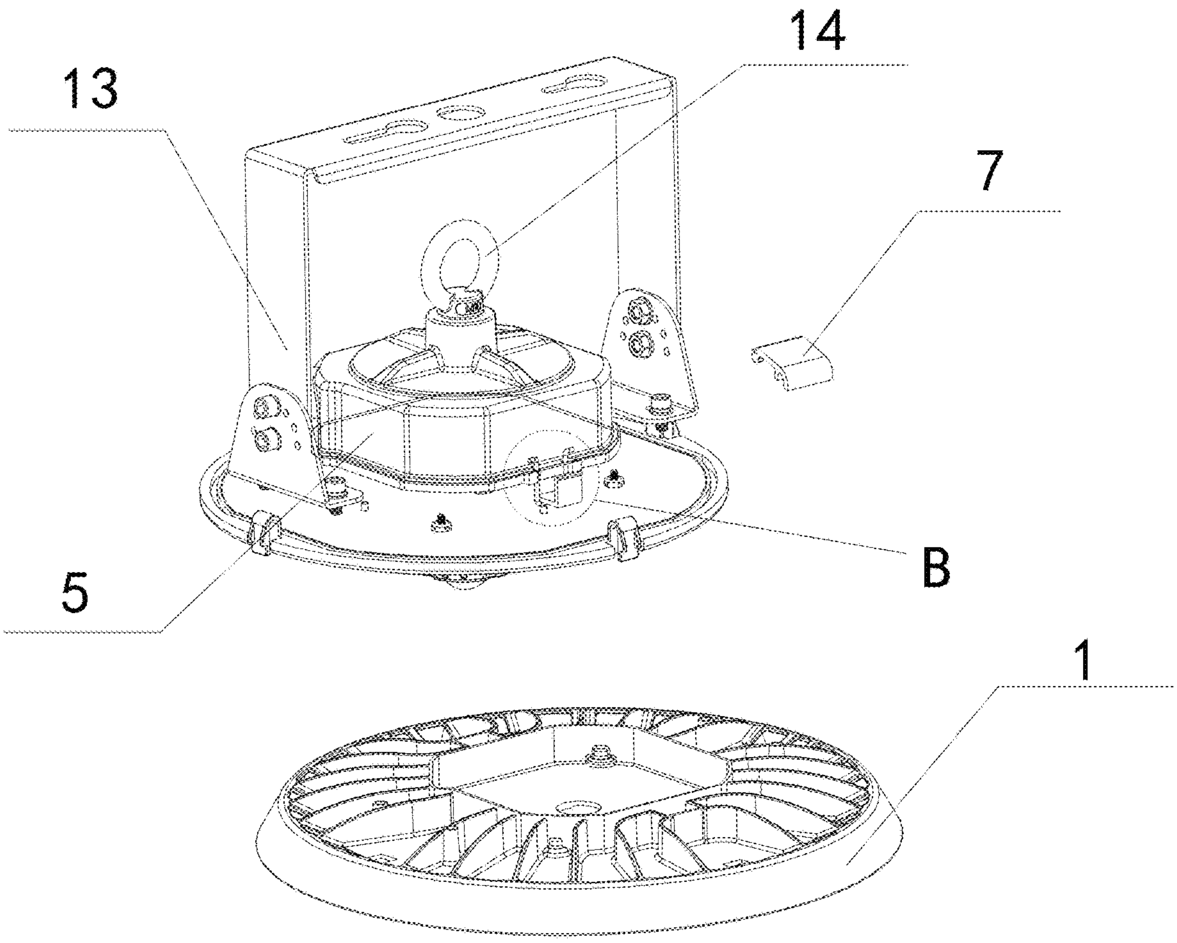
FIG. 3 is an exploded view of the LED lamp of FIG. 2.

1. Lamp body; 2. LED lamp panel; 3. Lens panel; 4. Driving power supply; 5. power supply box; 6. Sealing ring; 7. Locking handle; 8. Locking base; 9. Groove; 10. Connecting member; 11. Straight plate; 12. Reinforcing plate; 13. Mounting bracket; 14. Hanging ring; 15. Mounting space; 16. First hook. 17. Second hook; 18. Cam.

DETAILED DESCRIPTION OF THE EMBODIMENTS

The technical solution in the embodiment of the present application will be clearly and completely described below in conjunction with the drawings in the embodiment of the application. Apparently, the described embodiments are only some of the embodiments of the application, not all of them. Based on the embodiments in the present application, all other embodiments obtained by a person skilled in the art without making creative efforts shall all fall within the protection scope of the present application.

In the drawings of the embodiments of the present disclosure, the same or similar numbers correspond to the same or similar components. In the description of the present disclosure, it should be understood that terms "upper", "lower", "front" and "rear", "left", "right", "vertical", "horizontal", "lateral", "longitudinal", "top", "bottom", "inner", "outer", and other indicated orientation or positional relationships are based on the orientation or positional relationship shown in the drawings for convenience and simplicity of description of the present disclosure only, and not as an indication or implication that the devices or elements referred to must have or be constructed or operated in a specific orientation. Therefore, the terms describing positional relationships in the drawings are only for illustrative purposes and should not be construed as limitations of the present disclosure.

Referring to FIGS. 1 to 7, an LED lamp is provided according to an embodiment of the present disclosure. The LED lamp includes a lamp body 1, an LED lamp panel 2, a lens panel 3, a power supply assembly, and a quick disassembling structure. A front side of the lamp body 1 is provided with a mounting space 15, and the LED lamp panel 2 is mounted in the mounting space 15. The lens panel 3 covers the LED lamp panel 2. The power supply assembly is mounted on a rear side of the lamp body 1. The power supply assembly includes a power supply box 5 and a driving power supply 4 mounted in the power supply box 5, and the driving power supply 4 is electrically connected to the LED lamp panel 2. The quick disassembling structure is configured to detachably connect the power supply box 5 to the lamp body 1.

By providing the above-mentioned quick disassembling structure, when the driving power supply 4 needs to be replaced, the power supply box 5 can be quickly removed from the lamp body 1 without any additional tools, and the driving power supply 4 can be replaced.

Figure 4:
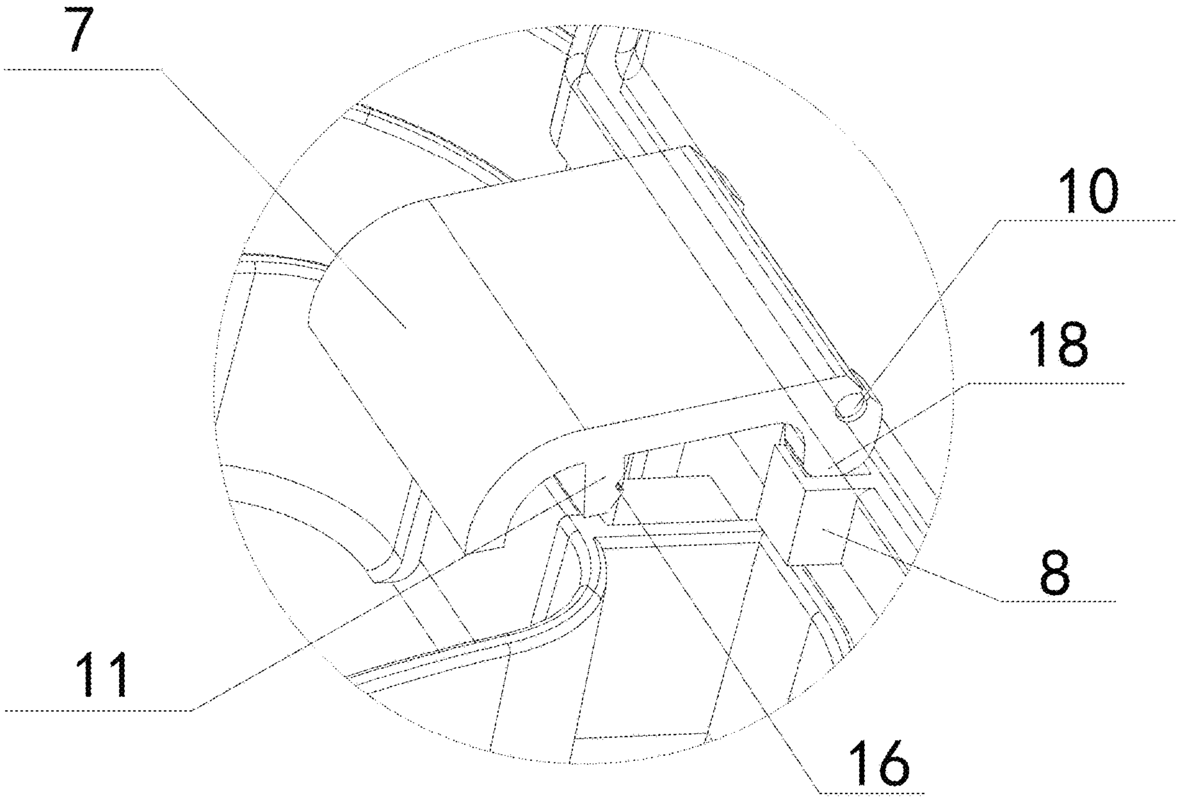
FIG. 4 is an enlarged view of portion A of FIG. 1.
Figure 5:
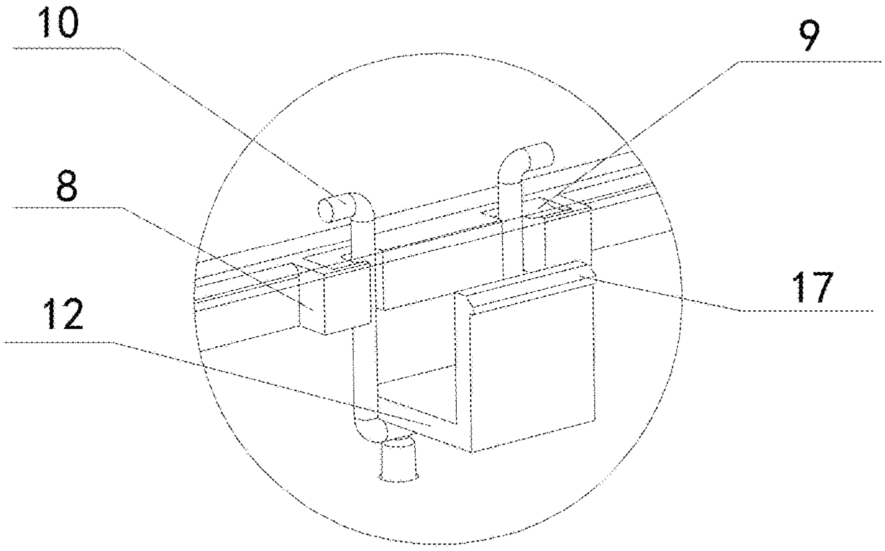
FIG. 5 is an enlarged view of portion B of FIG. 3.

Referring to FIG. 4 and FIG. 5, the quick disassembling structure can be a snap-fit assembly, which includes a locking handle 7 and a locking base 8. The locking base 8 extends outwardly from an edge of the power supply box 5 and is provided with a groove 9. The LED lamp further includes a connecting member 10. The locking handle 7 is rotatably connected to the lamp body 1 through the connecting member 10. An end of the locking handle 7 corresponding to the groove 9 is provided with a cam 18 configured to be engaged in the groove 9.

Specifically, the connecting member 10 is a U-shaped strip. An end of the connecting member 10 is fixed to the lamp body 1, and the locking handle 7 is rotatably connected to the other end of the connecting member 10. The locking handle 7 rotates relative to the connecting member 10 to enable the cam 18 to be engaged in or disengage from the groove 9.

Since the power supply box 5 is provided with the locking base 8, the locking base 8 is provided with the groove 9, the locking handle 7 is rotatably connected to the lamp body 1 through the connecting member 10, and the end of the locking handle 7 corresponding to the groove 9 is provided with the cam 18, when the driving power supply 4 needs to be replaced, the locking handle 7 is rotated away from the locking base 8 to enable the cam 18 to be disengaged from the groove 9. At this time, the power supply box 5 can be removed to replace the driving power supply 4 in the power supply box 5 without any additional tools. Correspondingly, when the driving power supply 4 needs to be mounted, the driving power supply 4 is mounted in the power supply box 5, then the power supply box 5 is placed on the lamp body 1, and then the locking handle 7 is rotated towards the locking base 8 to enable the cam 18 to be engaged in the groove 9. At this time, the power supply box 5 is fixed to the lamp body 1. The operation is simple and quick without any additional tools.

Referring to FIG. 4, the locking handle 7 includes a straight plate 11 on a middle portion thereof extending downwardly and a first hook 16 provided on the straight plate 11. Referring to FIG. 5, the lamp body 1 includes a reinforcing plate 12 corresponding to the straight plate 11, and the reinforcing plate 12 is provided with a second hook 17. When the cam 18 is engaged in the groove 9, the first hook 16 is engaged with the second hook 17. In this way, the power supply box 5 can be more stably mounted on the lamp body 1.

At least two quick disassembling structures are provided, so that the power supply box 5 can be fixed to the lamp body 1 more stably. In the embodiment, four quick disassembling structures are provided.

Figure 6:
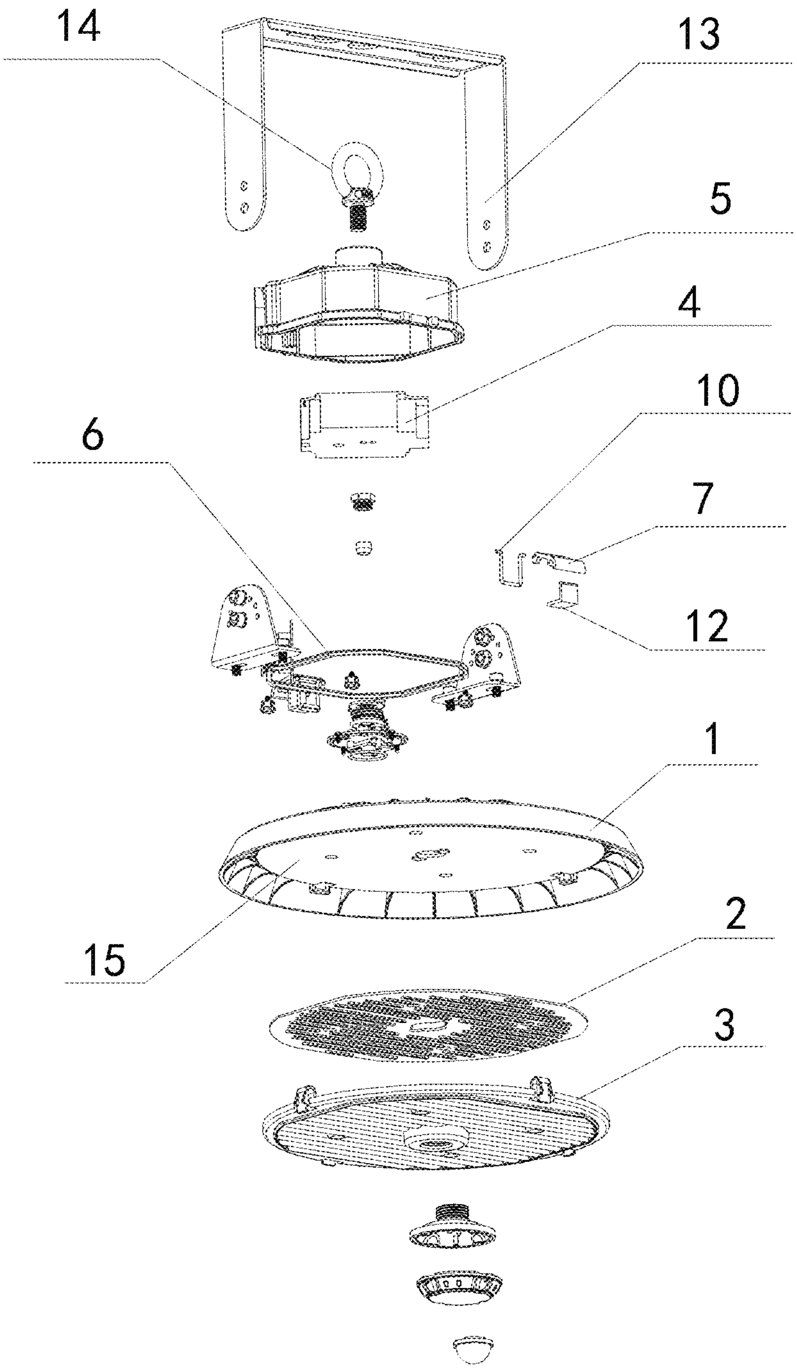
FIG. 6 is another exploded view of the LED lamp of FIG. 1.
Figure 7:
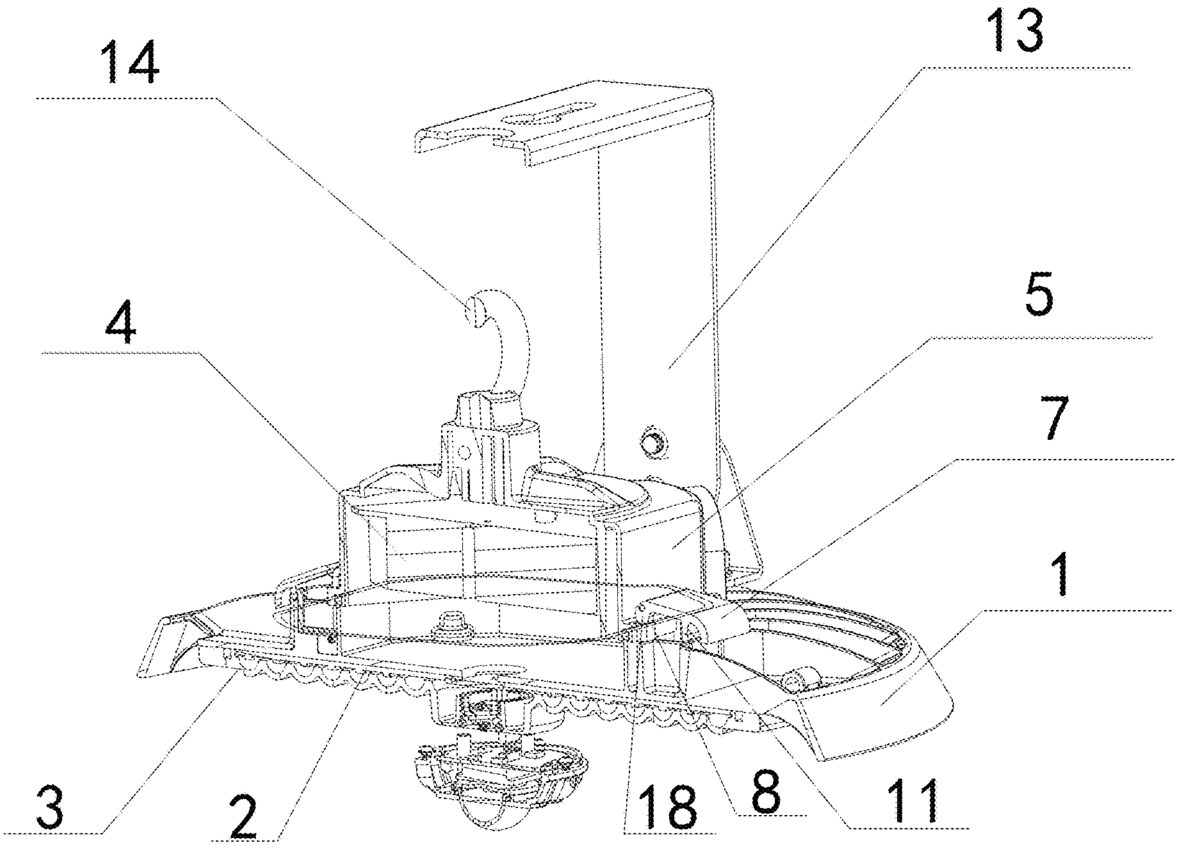
FIG. 7 is a sectional perspective view of the LED lamp of FIG. 1.

Referring to FIG. 6, the LED lamp further includes a sealing ring 6 is provided between the power supply box 5 and the lamp body 1, so that the driving power supply can achieve a good waterproof effect.

The LED lamp further includes a mounting bracket 13 connected to the lamp body 1 and a hanging ring 14 connected to the power supply box 5.

According to the above-mentioned LED lamp, the power supply box 5 can be removed manually to replace the driving power supply 4 without any additional tools, and the operation is simple and convenient.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. An LED lamp, comprising:

a lamp body provided with a mounting space on a front side thereof;

an LED lamp panel mounted in the mounting space;

a lens panel covering the LED lamp panel;

a power supply assembly mounted on a rear side of the lamp body, the power supply assembly comprising a power supply box and a driving power supply mounted in the power supply box, and the driving power supply being electrically connected to the LED lamp panel;

a connecting member; and a quick disassembling structure through which the power supply box being detachably connected to the lamp body, wherein the quick disassembling structure is a snap-fit assembly, the snap-fit assembly comprises a locking handle and a locking base, the locking base extends outwardly from an edge of the power supply box and is provided with a groove, the locking handle is rotatably connected to the lamp body through the connecting member, and an end of the locking handle is provided with a cam configured to be engaged in the groove.

2. The LED lamp according to claim 1, wherein an end of the connecting member is fixed to the lamp body, and the locking handle is rotatably connected to another end of the connecting member.

3. The LED lamp according to claim 2, wherein the locking handle comprises a straight plate on a middle portion thereof extending downwardly and a first hook provided on the straight plate, the lamp body comprises a reinforcing plate corresponding to the straight plate, the reinforcing plate is provided with a second hook, when the cam is engaged in the groove, the first hook is engaged with the second hook.

4. The LED lamp according to claim 1, wherein at least two quick disassembling structures are provided.

5. The LED lamp according to claim 1, further comprising a mounting bracket connected to the lamp body.

6. The LED lamp according to claim 1, further comprising a hanging ring connected to the power supply box.

7. The LED lamp according to claim 1, further comprising a sealing ring provided between the power supply box and the lamp body.

* * * * *